March 27, 1956 W. A. OGLETREE 2,740,070
HORIZONTAL DEFLECTION SYSTEM FOR TELEVISION RECEIVER
Filed March 15, 1952
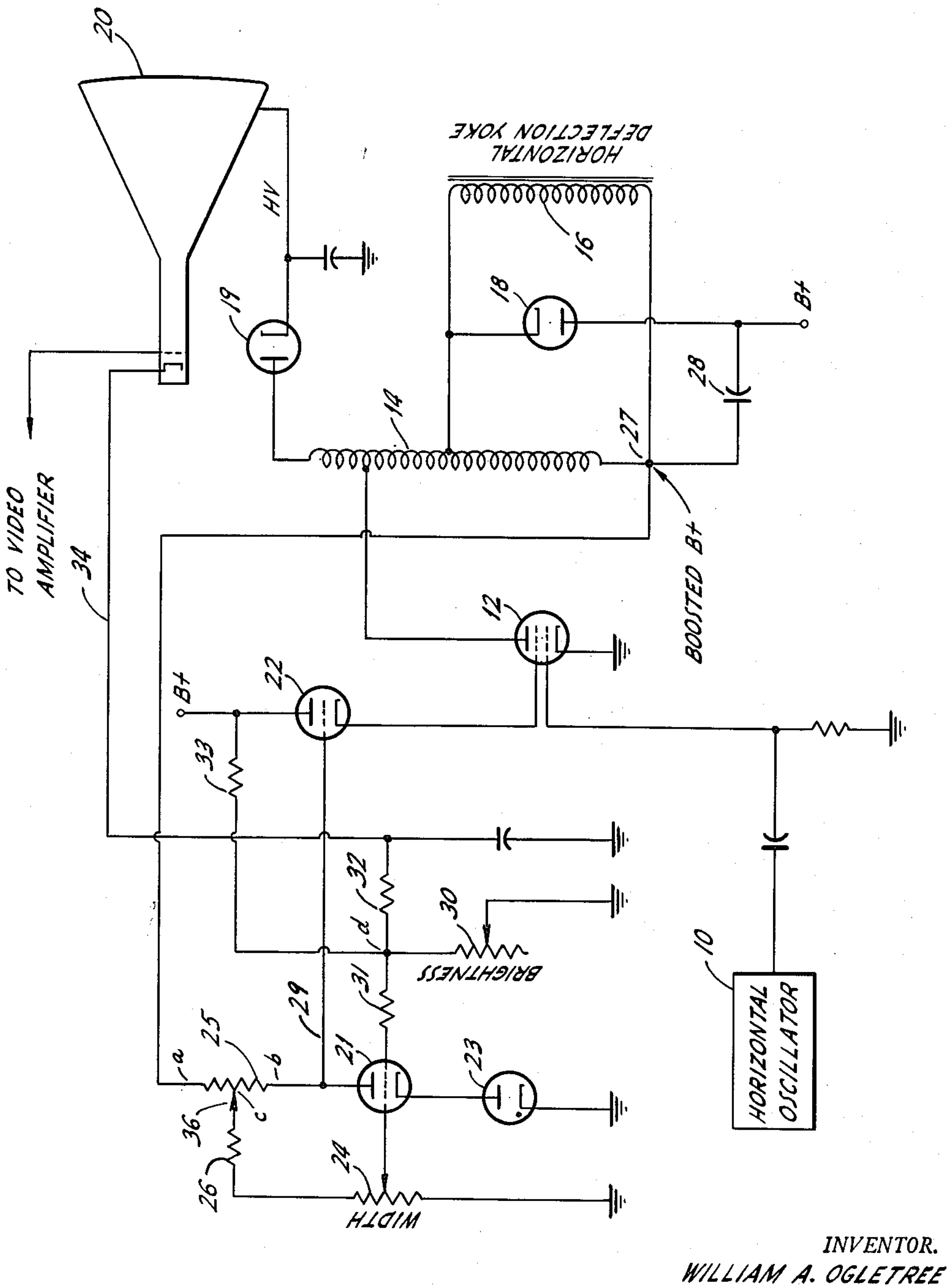
INVENTOR.
WILLIAM A. OGLETREE
BY
Brown, Denk & Synnestvedt
AGENTS United States Patent Office 2,740,070

Patented Mar. 27, 1956

2,740,070

HORIZONTAL DEFLECTION SYSTEM FOR TELEVISION RECEIVER

William A. Ogletree, Southampton, Pa., assignor to Philco Corporation, Philadelphia, Pa., a corporation of Pennsylvania Application March 15, 1952, Serial No. 276,801

9 Claims. (Cl. 315—27)

The invention herein described and claimed relates to television-receiver deflection systems, and particularly to means for improving the stability of the deflection system against variations in A. C. line voltage, tube characteristics, component values, and picture-tube beam current.

While stability of the vertical, as well as of the horizontal, deflection system against variations in the abovementioned values is advantageous and desirable, stabilization of the two deflection systems (horizontal and vertical) presents separate and distinct problems requiring separate and distinct treatments. The present invention is concerned primarily with improving the stability of the horizontal, as distinguished from the vertical, deflection system.

It is highly desirable, of course, that the picture width of a television receiver be maintained substantially constant despite variations unavoidably occurring in the A. C. line voltage, as otherwise annoying changes in picture width would occur whenever one of the various electrical appliances in the home was turned on or off, or whenever the load on the A. C. supply mains changed.

It is also desirable that the picture width be substantially independent of variations in the D. C. component of the cathode-ray-tube beam current, as otherwise the picture width would change whenever the average picture brightness changed, whether due to a change in the average video signal or to an adjustment of the brightness control.

It is further desirable that the picture width be substantially independent of variations in the characteristics of the horizontal-deflection amplifier tube, as otherwise circuit adjustments which are right for one tube may not be satisfactory for a replacement tube of the same type.

The provision, in a television receiver, of a horizontal-deflection system stabilized against variations in line voltage, average cathode-ray-tube beam current, and amplifier-tube characteristics is desirable, not only because abrupt and annoying changes in picture width are thereby eliminated, but also because lower power-rated, wider tolerance, and hence less expensive, components may be employed. For example, with a stabilized horizontal-deflection system, the horizontal output tube is not required to have excess power rating so as to be able to take care of conditions of high line-voltage and, as a consequence, a less expensive tube with a smaller power margin may be used.

Another advantage resulting from the use of a stabilized horizontal-deflection system is that, since the plate dissipation of the horizontal-deflection output tube will then be substantially constant throughout the range of A. C. line-voltage variations, the deflection output tube and its associated circuitry should have a longer trouble-free life. In addition, in television receivers in which the picture-tube second anode voltage is derived from the deflection-yoke current, as is quite common, stabilizing the horizontal-deflection system tends to stabilize the second anode voltage. This is of considerable importance, particularly in television receivers employing a low voltage B+ supply, and/or D. C. restoration, and/or direct-coupled video stages, and/or a higher efficiency deflection yoke. For example, if the efficiency of the yoke be increased, the regulation of the second anode voltage will tend to decrease, thus making dynamic stabilization of second anode voltage more desirable than ever.

It is an object, therefore, of the present invention to provide, in a television receiver having a deflection system wherein a so-called boost voltage (hereinafter more specifically defined) is developed, means adapted to maintain substantially improved constancy of picture width and second anode voltage despite variations unavoidably occurring in line voltage, and/or deflection-amplifier-tube characteristics, and/or picture-tube average beam current.

Another object is to provide, in a television receiver, a horizontal-deflection system adapted to maintain both the picture width and the picture-tube second anode voltage substantially constant despite changes occurring in line voltage, and/or horizontal-deflection-amplifier tube characteristics, and/or picture-tube average beam current.

In accordance with the present invention, these objects are accomplished by the provision of regulating means responsive both to variations in the B+ supply voltage and to variations in the "boosted" B+ voltage (defined below) for deriving control signals which are utilized to control the output of the horizontal deflection amplifier in such manner as to achieve substantial stabilization of picture width and picture-tube second anode voltage.

Preferably, additional means, responsive to adjustments in the brightness control of the television receiver, are included for controlling additionally the output of the horizontal deflection amplifier, thereby to provide further stabilization of second anode voltage and picture width, particularly against changes in picture-tube average beam current.

As used in this specification, the boosted B+ voltage, referred to above, is that voltage which is developed conventionally in television receivers and is comprised of two components, one, the B+ supply voltage, and the other, a D. C. voltage developed in the horizontal damping tube circuit. These two voltages, added together, comprises the so-called boosted B+ voltage. For convenience, the latter component (developed in the horizontal damping tube circuit) will be referred to throughout this specification as the boost component or boost voltage, while the sum of the B+ supply voltage and of the boost voltage will be referred to as the boosted B+ voltage.

One might think that to stabilize satisfactorily the picture width against changes in the B+ supply voltage, particularly in television receivers having the width control in the screen circuit of the horizontal-deflection amplifier tube, as is quite conventional, it would be sufficient to provide control means for maintaining the screen potential constant despite the changes in B+. However, such is not the case. I found that even with the screen potential held constant, the picture width changed appreciably with variations in B+. I realize that when B+ changes, the plate voltage as well as the screen voltage of the deflection amplifier tube tends to change. Apparently, since the plate current is not independent of plate voltage, the plate current changes sufficiently to produce a noticeable change in picture width, despite the fact that the screen potential is held constant. Specifically, I found that the picture width increases when B+ increases and decreases when B+ decreses. Hence, to maintain the picture width substantially constant against changes in line voltage, the potential of the screen of the horizontal deflection amplifier tube should be decreased (made less positive) when B+ increases, and should be increased (made more positive) when B+ decreases. To hold the screen potential constant against changes in line voltage does not provide sufficient correction.

On the other hand, I found that to regulate the screen potential of the horizontal deflection amplifier tube in a manner to hold the boosted B+ voltage substantially constant against changes in line voltage results in overcorrection. The explanation is to be found in the fact that the boosted B+ voltage is, as previously described, comprised of two components, one of which is the B+ supply voltage and the other of which is the boost voltage. It will be seen that to hold the boosted B+ voltage substantially constant when one component, for example, the B+ supply voltage, changes, the other component, in this instance the boost voltage, must change in the opposite direction. For example, if the boosted B+ voltage were to be held constant when the B+ supply voltage increased, the boost voltage must necessarily decrease. And, since the boost voltage is derived from the circulating current in the deflection yoke, if the boost voltage be decreased, the picture width and second anode voltage will both decrease. Hence, it will be seen that to maintain the boosted B+ voltage constant against changes in line voltage is to provide too much correction.

To summarize, I found that holding the screen potential constant against changes in line voltage results in undercorrection, while regulating the screen potential in such manner as to hold the boosted B+ voltage constant results in over-correction. The problem, therefore, was to provide means effective to provide correct compensation.

In a conventional television receiver, which includes such components as a horizontal output transformer, a horizontal deflection yoke, a damper tube, a high-voltage rectifier, and a capacitor in the damping circuit across which the boost voltage is developed, the picture width is a function of the current in the horizontal deflection yoke, which in turn is dependent upon the voltage across the yoke. The voltage developed across the damping-circuit capacitor, herein called the boost voltage, is substantially equal to the peak voltage across the yoke minus the voltage drop across the damper tube. Hence, if the picture width be held constant, the boost voltage will be constant; and, conversely, if the boost voltage be held constant, the picture width will remain constant. Since the boost voltage is superimposed upon the B+ supply voltage, and since the latter varies with variations in line voltage, to provide substantially correct compensation against changes in line voltage it was necessary to devise a scheme for maintaining the boost component constant while permitting the sum of the B+ supply voltage and the boost component to vary.

Faced with this problem, my invention proposes an arrangement whereby control signals may be derived from a point whose potential is intermediate that of B+ and boosted B+. The changes occurring in the potential of the intermediate point with changes in line voltage are such that, by means of a regulator circuit responsive to the derived control signals, the screen potential of the horizontal-deflection amplifier tube is so varied to to maintain the plate current of the tube substantially constant despite the changes in its plate voltage, thereby to maintain the deflection-yoke current substantially constant. Thus, the boost voltage and picture width are held substantially constant despite changes in line voltage. And, since the horizontal-deflection amplifier tube is in the regulator loop, the amplifier tube may be replaced by other tubes of the same type without disturbing the picture width, even though the replaced and replacement tubes have somewhat different characteristics and are not identical in performance.

The statement above made (that the screen potential is varied in a manner to hold the plate current constant) assumes that the picture-tube average beam current remains substantially constant. If the average beam current changes due to changes either in video content or in the setting of the brightness control, the load on the horizontal-deflection amplifier changes, and the plate current of the amplifier must change in order to maintain the same current in the deflection yoke.

While the arrangement thus far described, stabilizes the picture width and the picture-tube second anode voltage, not only against changes in line voltage, deflection-tube characteristics, and component values, but also at least to some extent, against changes in the D. C. component of the picture-tube beam current, whether due to changes in video content or in the setting of the background control, the present invention contemplates the inclusion, as an added feature, of an arrangement whereby when the brightness control is varied the drive of the regulator control tube is altered, thereby to change the plate-current output of the horizontal-deflection amplifier in such direction and to such an extent as substantially to avoid any change occurring in picture width or second anode voltage.

The objects, features and advantages of the present invention, and the manner in which the objects are accomplished, will be best understood from a consideration of the following detailed description of a preferred embodiment illustrated in the single figure of drawing.

Referring now to the drawing, there is shown schematically a portion of a television receiver comprising the horizontal oscillator 10, the horizontal deflection amplifier tube 12, the horizontal output transformer 14, the horizontal deflection yoke 16, the damping tube 18, the high-voltage rectifier 10, and the cathode-ray picture tube 20.

Except to the extent modified by the present invention, to be described in detail, the manner in which the above-mentioned components function is well known and conventional and speed not be described in detail in this specification.

In accordance with my invention, I provide a voltage-regulator circuit which, in the drawing, comprises the triodes 21 and 22. Triode 21 functions as the control tube while triode 22 functions as the variable-resistance series tube. The cathode of control tube 21 is maintained at a substantially constant potential by means of the cold-cathode gas-filled regulator tube 23, which may conveniently be a neon tube, type NE2. The grid of control tube 21 is connected to the movable contact arm of width control 24, while the plate of control tube 21 is connected, by way of the fixed-resistance element of potentiometer 25, to the junction 27 at the lower ends of horizontal output transfer 14 and horizontal deflection yoke 16. Capacitor 28, connected between junction 27 and the plate of horizontal damping tube 18, functions as the filter capacitor for the damping circuit. The plate of the damping tube 18, and hence also one side of capacitor 28, are connected to the B+ supply voltage, as shown.

As is conventional and well known, a voltage, referred to herein as the boost component or boost voltage, is developed across the damping-tube filter capacitor 28. This voltage adds to the B+ supply voltage to produce, at junction 27, a voltage referred to herein as the boosted B+ voltage. This boosted B+ voltage is supplied to the plate of the horizontal-deflection amplifier tube 12 by way of a portion of the winding of horizontal output transfer 14.

Returning now to the regulator control tube 21, the plate of this tube is also connected, by way of conductor 29, directly to the grid of the regulator series tube 22. The plate of series tube 22 is connected to the B+ supply voltage and its cathode is connected to the screen of the horizontal-deflection amplifier tube 12.

The upper end of the resistance element of width control 24, previously referred to, is connected, by way of a resistor 26, to the adjustable contact arm 36 of potentiometer 25. It is to be understood, however, that in a fully-designed production receiver adjustment of the movable contact 36 of potentiometer 25 will ordinarily not be necessary, and that it will be economical to employ, in lieu of the potentiometer 25, a pair of fixed resistors of appropriate value with resistor 26 connected to their common junction, i. e. with one fixed resistor connected between points *a* and *c*, and another between points *c* and *b*.

The circuitry thus far described is adapted particularly to stabilize the picture width and picture-tube second anode voltage against changes in B+ due to variations occurring in line voltage, and against variations in relevant circuit components. It will also provide some stabilization of these values against changes in picture-tube beam current, whether due to changes in video content or to adjustment of the brightness control. However, to fully stabilize the picture width and second anode voltage against changes in the D.-C. component of the picture-tube beam current resulting from adjustment in brightness control, I prefer to employ the additional arrangement shown in the drawing. As there shown, brightness control 30 comprises a variable resistance the fixed upper end of which is connected, by way of resistors 31, 32 and 33, to the grid of regulator control tube 21, the cathode of picture tube 20 and the B+ supply voltage, respectively. The manner in which this arrangement operates to provide increased stabilization against variations in beam current will be described hereinafter.

With respect now to the operation of the complete circuit shown in the drawing, it will become clear from what follows that when, for example, variations in line voltage occur, thereby producing changes in the B+ supply voltage and in the boosted B+ voltage, the arrangement of the present invention operates to change the potential of the screen of the horizontal-deflection amplifier tube 12 in such direction and to such an extent as to maintain the plate current, and hence the picture width and second anode voltage, substantially constant. It will be seen from the drawing that the screen potential of tube 12 is a function of the plate-current resistance of the regulator series tube 22, and that the plate-current resistance of tube 22 is, in turn, a function of the signal applied to its grid. It will be further seen that the signal applied to the grid of tube 22 is a function of the plate current flowing in control tube 21 which, in turn, is dependent upon the voltage applied to its grid.

Assuming that width control 24 and brightness control 30 are each set at a fixed position, the voltage applied to the grid of tube 21 is dependent upon the position of the movable contact 36 of potentiometer 25. For, it will be seen that if the movable contact 36 be moved to the upper end of the fixed resistance element of potentiometer 25 (point *a*) the voltage on the grid of tube 21 will vary in a manner corresponding to that in which the boosted B+ voltage varies. On the other hand, if the movable contact 36 be moved to the lower end of the fixed resistance element (point *b*) the voltage on the grid of tube 21 will vary in a manner corresponding substantially to that in which the B+ supply voltage varies. The explanation of the latter is that the potential at point *b*, being the potential at the grid of pass tube 22, tends to follow the cathode of tube 22 which, in turn, follows changes in the B+ supply voltage applied to the plate of the tube.

I found that, by properly adjusting the position of the movable contact 36 of potentiometer 25, substantial stabilization of the plate current in horizontal-deflection amplifier tube 12, and hence substantial stabilization of the picture width and second anode voltage, could be achieved despite variations occurring in B+ and in the boosted B+ voltage. This result flows from the fact that the variations at any point located between points *a* and *b*, for example, at point *c*, are intermediate the variations in B+ and boosted B+ voltage. Thus, there is a point between points *a* and *b* at which the variations in potential (occurring, for example, as a result of variations in line voltage) are of proper magnitude to serve as the control-signal source for the regulator circuit. With such a point as the control-signal source, the action of the regulator circuit, arranged as shown in the drawing, is such that the D.-C. potential of the plate of the horizontal-deflection amplifier tube 12 is permitted to change, but only to the extent that its B+ component has changed. Thus, the bost component of the D.-C. plate potential of tube 12 remains constant.

Stated another way, by the arrangement of the present invention, in response to variations in B+ and/or boosted B+, the screen potential of the horizontal-deflection amplifier tube is varied in a direction and to an extent necessary to maintain the plate current constant. Thus, the boost voltage, the picture width and the picture-tube second anode voltage all remain substantially constant despite the changes occurring in B+ and/or boosted B+. Thus, substantially the correct amount of compensation is effected.

Consider now the manner in which the circuit arrangement proposed by the present invention and shown in the drawing regulates the picture width and second anode voltage against changes in picture-tube beam current due to changes in the setting of the brightness control. It will be seen that if brightness control 30 be moved in a direction to decrease the positive potential at point *d*, thereby to decrease the potential on the cathode of picture tube 20 so as to increase the picture brightness, the D.-C. potential on the grid of regulator control tube 21 is also decreased, thereby decreasing the tube bias. The D.-C. plate potential of control tube 21 thereupon rises and the plate resistance of series tube 22 decreases, thus causing the screen potential of the horizontal deflection amplifier tube 12 to become more positive. As a result, the plate-current output of tube 12 is increased sufficiently to maintain a substantially constant current in the deflection yoke 16 while providing increased current through the beam-current path, the latter comprising the high-voltage rectifier 19, the beam-current path of picture-tube 20, the conductor 34, the resistor 32, and the brightness control 30. Stated another way, the arrangement of the present invention is such that a change in brightness control 30 produces the proper change in the drive of the regulator to cause the output of the deflection amplifier to change and correct for the change in second anode voltage that would otherwise occur. Thus, changes in high voltage, picture width and focus that would otherwise occur when the brightness control was adjusted are substantially avoided, or at least greatly minimized.

It will be seen that, by the means hereinabove described, I am able to stabilize the picture width, picture-tube second anode voltage, and also the focus against variations in line voltage, deflection-tube characteristics, relevant component values, and picture-tube average beam current.

Having described my invention, I claim:

1. In a television receiver; a source of B+ supply voltage; a deflection system including a deflection-amplifier tube having an output circuit adapted to develop a boost voltage which is superimposed upon said B+ supply voltage to provide a boosted B+ voltage; a variable impedance serially connected between said source of B+ supply voltage and an accelerating electrode of said deflection-amplifier tube; and means for controlling automatically the impedance of said variable impedance as a function of variations occurring both in said B+ supply voltage and in said boosted B+ voltage, thereby to control the output of said deflection-amplifier tube in response to variations occurring in said B+ supply and in said boosted B+ voltages.

2. In a television receiver; a source of B+ supply voltage; a deflection system including a deflection-amplifier tube and a boost circuit for developing a boost voltage which is added to said B+ supply voltage to provide a boosted B+ voltage; means for applying said boosted B+ voltage to the plate of said deflection-amplifier tube; a series tube connecting said source of B+ supply voltage to an accelerating electrode of said deflection-amplifier tube; and means for controlling automatically the impedance of said series tube in response to variations occurring in said B+ supply voltage and in said boosted B+ voltage, thereby to control the output of said deflection-amplifier tube as a function of variations occurring in said B+ supply and in said boosted B+ voltages.

3. In a television receiver; a source of B+ supply voltage; a deflection system including a deflection-amplifier tube and a boost circuit for developing a boost voltage which is added to said B+ supply voltage to provide a boosted B+ voltage; an impedance connected between said boosted B+ voltage and a point whose potential varies as a function of variations occurring in said B+ supply voltage; a series regulator tube connected between said source of B+ supply voltage and an accelerating electrode of said deflection-amplifier tube; and a control regulator tube responsive to voltage variations occurring at a predetermined point on said impedance for controlling the impedance of said series regulator tube, thereby to control the potential of said accelerating electrode of said deflection-amplifier tube.

4. Apparatus as claimed in claim 3 characterized by the fact that said point whose potential varies as a function of variations occurring in said B+ supply voltage and to which one end of said impedance is connected is the control grid of said series regulator tube.

5. In a television receiver; a source of B+ supply voltage; a deflection system including a deflection-amplifier tube and a circuit wherein a boost voltage is developed which is added to said B+ supply voltage to provide a source of boosted B+ voltage; means connecting said source of boosted B+ voltage to the plate of said deflection-amplifier tube; a regulator circuit including a series tube having at least triode elements connected between said source of B+ supply voltage and an accelerating electrode of said deflection-amplifier tube, said regulator circuit also including a control tube having at least triode elements connected between the control grid of said series tube and a point of fixed reference potential; an impedance connecting said source of boosted B+ voltage to a point in said regulator circuit whose potential tends to follow variations in said B+ supply voltage; and means for connecting the control grid of said control tube to a predetermined point on said impedance, whereby the gain of said control tube and the impedance of said series tube are varied as a function of the variations in potential at said predetermined point on said impedance.

6. In a television receiver; a source of B+ supply voltage; a horizontal deflection system including a horizontal-deflection-amplifier tube having at least tetrode elements and a damping-tube circuit wherein a boost voltage is developed which is added to said B+ supply voltage to provide a source of boosted B+ voltage; means connecting said source of boosted B+ voltage to the plate of said horizontal-deflection-amplifier tube; a regulator circuit comprising a series triode and a control triode, said series triode being connected between said source of B+ supply voltage and the screen grid of said horizontal-deflection-amplifier tube, said control triode being connected between the control grid of said series triode and a point of fixed reference potential; an impedance connected between said source of boosted B+ voltage and a point in the circuit of said series triode whose potential tends to follow variations in said B+ supply voltage; and means connecting the control grid of said control tube to a predetermined point on said impedance, thereby to vary the gain of said control tube as a function of the potential at said predetermined point on said impedance, thereby to vary the impedance of said series tube, and thereby to vary the potential on the screen grid of said horizontal-deflection-amplifier tube in a direction and to an extent to maintain a substantially constant deflection current despite variations occurring in said B+ supply voltage and/or in said boosted B+ voltage.

7. In a television receiver; a source of B+ supply voltage; a horizontal deflection system including a horizontal-deflection-amplifier tube having at least tetrode elements and a damping-tube circuit wherein a boost voltage is developed which is added to said B+ supply voltage to provide a source of boosted B+ voltage; means connecting said source of boosted B+ voltage to the plate of said horizontal-deflection-amplifier tube; a regulator circuit comprising a series tube and a control tube, each of said tubes having at least triode elements, the plate of said series tube being connected to said source of B+ supply voltage, the cathode of said series tube being connected to the screen grid of said horizontal-deflection-amplifier tube, the control grid of said series tube being connected to the plate of said control tube, the cathode of said control tube being connected to a point of fixed potential, the control grid of said control tube being connected to a point whose potential is intermediate that of said B+ supply voltage and that of said boosted B+ voltage, said point being located on an impedance connected between said source of boosted B+ voltage and the control grid of said series tube, whereby, in response to variations in voltage occurring at said point, the said regulator tubes function to vary the screen potential of said horizontal-deflection-amplifier tube in such direction and to such an extent as to maintain substantially constant the deflection-current output of said horizontal-deflection-amplifier tube despite variations occurring in said B+ supply voltage and/or in said boosted B+ voltage.

8. In a television receiver; a source of B+ supply voltage; a deflection system including a deflection-amplifier tube and a boost circuit for developing a boost voltage for superimposing upon said B+ supply voltage to provide a boosted B+ voltage; a series impedance connected between said source of B+ supply voltage and an accelerating electrode of said deflection-amplifier tube; and means for controlling automatically the impedance of said series impedance as a function of the sum of the variations occurring both in said B+ supply voltage and in said boosted B+ voltage, thereby to control the output of said deflection-amplifier tube as a function of the sum of the variations occurring both in said B+ supply and in said boosted B+ voltages.

9. In a television receiver; a source of B+ supply voltage; a deflection system including a deflection-amplifier tube, a damper tube and a capacitor, said deflection-amplifier tube and said damper tube being connected in series with said B+ supply voltage, said damper tube in cooperation with said capacitor developing a boost voltage for superimposing upon said B+ supply voltage to provide a boosted B+ voltage; means for applying said boosted B+ voltage to the plate of said deflection-amplifier tube; a series tube connecting said source of B+ supply voltage to an accelerating electrode of said deflection-amplifier tube; and means for controlling automatically the impedance of said series tube in response to variations occurring in both said B+ supply voltage and said boosted B+ voltage, thereby to control the output of said deflection-amplifier tube in response to variations occurring in both said B+ supply and said boosted B+ voltages.

References Cited in the file of this patent

UNITED STATES PATENTS

| | | |
|---|---|---|
| 2,523,108 | Friend | Sept. 19, 1950 |
| 2,543,305 | Schwarz | Feb. 27, 1951 |
| 2,564,588 | Wendt | Aug. 14, 1951 |
| 2,566,432 | Sziklai | Sept. 4, 1951 |
| 2,579,627 | Tourshou | Dec. 25, 1951 |
| 2,584,213 | Longo et al. | Feb. 5, 1952 |
| 2,588,652 | Nelson | Mar. 11, 1952 |
| 2,588,659 | Pond | Mar. 11, 1952 |
| 2,599,798 | Wissel | June 10, 1952 |
| 2,606,306 | Bridges | Aug. 5, 1952 |
| 2,621,305 | Little | Dec. 9, 1952 |
| 2,679,550 | Parker | May 25, 1954 |